United States Patent
Adcock et al.

(10) Patent No.: US 10,122,028 B2
(45) Date of Patent: Nov. 6, 2018

(54) COOLING SYSTEM FOR FUEL CELLS

(71) Applicant: Intelligent Energy Limited, Loughborough (GB)

(72) Inventors: Paul Leonard Adcock, Loughborough (GB); Peter David Hood, Loughborough (GB); Anthony Newbold, Loughborough (GB); Tobias Reisch, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/629,604

(22) Filed: Jun. 21, 2017

(65) Prior Publication Data

US 2017/0352897 A1 Dec. 7, 2017

Related U.S. Application Data (63) Continuation of application No. 14/408,503, filed as application No. PCT/GB2013/051596 on Jun. 19, 2013, now Pat. No. 9,748,585.

(30) Foreign Application Priority Data

Jun. 20, 2012 (GB) .................................. 1210880.9

(51) Int. Cl.
*H01M 8/04007* (2016.01)
*H01M 8/2465* (2016.01)
(Continued)

(52) U.S. Cl.
CPC ... *H01M 8/04074* (2013.01); *H01M 8/04014* (2013.01); *H01M 8/0432* (2013.01);
(Continued)

(58) Field of Classification Search
CPC . H01M 8/0414; H01M 8/0432; H01M 10/613
See application file for complete search history.

(56) References Cited

U.S. PATENT DOCUMENTS 6,497,971 B1 12/2002 Reiser
6,503,650 B1 1/2003 Yasuo et al.
(Continued)

FOREIGN PATENT DOCUMENTS

CN 1455966 A 11/2003
CN 1604369 A 4/2005
(Continued)

OTHER PUBLICATIONS

International Search Report and Written Opinion dated Oct. 10, 2013; issued in International Patent Application PCT/GB2013/051569.
(Continued)

*Primary Examiner* — Olatunji Godo
(74) *Attorney, Agent, or Firm* — Baker & Hostetler LLP (57) ABSTRACT

A fuel cell stack assembly comprises a stack of fuel cells, each fuel cell having a cooling air conduit with an input/output ventilation aperture disposed on a ventilation face of the stack. The ventilation apertures form an array over said ventilation face of the stack. A first fan is configured to direct air flow through a first portion of the ventilation face and a second fan is configured to direct air flow through a second portion of the ventilation face. A reconfigurable plenum is in fluid communication with the first fan and the second fan and has a first configuration in which air is directed, by the first and second fans, through the first and second portions of the ventilation face in the same direction, and a second configuration in which air is directed, by at least one of the fans, respectively through the first and second portions of the ventilation face in opposing directions. When operating in the second configuration, the directions of air flow through
(Continued)

the first and second portions of the ventilation face are periodically reversed.

7 Claims, 7 Drawing Sheets

(51) Int. Cl.
    *H01M 8/04014*     (2016.01)
    *H01M 8/04089*     (2016.01)
    *H01M 8/0432*     (2016.01)
    *H01M 8/04492*     (2016.01)
    *H01M 8/04701*     (2016.01)
    *H01M 8/04746*     (2016.01)
    *H01M 8/1018*     (2016.01)

(52) U.S. Cl.
    CPC ... *H01M 8/04089* (2013.01); *H01M 8/04097* (2013.01); *H01M 8/04492* (2013.01); *H01M 8/04701* (2013.01); *H01M 8/04753* (2013.01); *H01M 8/04761* (2013.01); *H01M 8/04768* (2013.01); *H01M 8/2465* (2013.01); *H01M 2008/1095* (2013.01)

(56) References Cited

U.S. PATENT DOCUMENTS

| | | |
|---|---|---|
| 2003/0031900 A1 | 2/2003 | Tajima et al. |
| 2005/0079394 A1 | 4/2005 | Tomioka et al. |
| 2006/0172163 A1 | 8/2006 | Suh et al. |
| 2007/0154757 A1 | 7/2007 | Okazaki |
| 2007/0231164 A1 | 10/2007 | Eybergen et al. |
| 2008/0138692 A1 | 6/2008 | Mogi |
| 2011/0311896 A1 | 12/2011 | Harper et al. |

FOREIGN PATENT DOCUMENTS

| | | |
|---|---|---|
| JP | 2001-015136 A | 1/2001 |
| JP | 2005-306736 A | 4/2005 |
| JP | 2006-210351 A | 8/2006 |
| JP | 2008-100256 A | 1/2008 |
| JP | 2008-146883 A | 6/2008 |
| JP | 2009-520141 A | 5/2009 |
| WO | WO 2000/054357 A1 | 9/2000 |
| WO | WO 2007/070596 A2 | 6/2007 |

OTHER PUBLICATIONS

GB Search Report dated September Sep. 25, 2012; issued in GB Patent Application 1210880.9.
Singapore Patent Application No. 11201408468S; Written Opinion; dated Aug. 21, 2015; 8 pages.

COOLING SYSTEM FOR FUEL CELLS

RELATED

This Patent Application is a continuation of U.S. patent application Ser. No. 14/408,503 filed Dec. 16, 2014, now U.S. Pat. No. 9,748,585, which claims priority to International Patent Application PCT/GB2013/051596, filed Jun. 19, 2013, and United Kingdom Patent Application GB1210880.9, filed Jun. 20, 2012, the contents of which are incorporated by this reference as if fully set forth herein in their entirety.

FIELD

The present invention relates to electrochemical fuel cells disposed in a stack formation, and in particular to cooling systems for such fuel cell stacks.

BACKGROUND

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack is formed comprising a number of series-connected MEAs arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Cooling may be achieved by forcing air through the fuel cell stack. In an open cathode stack, the oxidant flow path and the coolant flow path are the same, i.e. forcing air through the cathode fluid flow paths both supplies oxidant to the cathodes and cools the stack.

However, optimal operation of the fuel cell stack relies on maintaining the fuel cells at their optimal operating temperature and fuel cell stack efficiency can be adversely affected at low ambient temperatures or when a stack is starting up from cold. Thus, it is desirable to be able to regulate the cooling efficiency of air flows through the cathode.

One technique for achieving this is to recycle some or all of the exhaust air from a fuel cell stack that has been passed over the cathodes back to the stack air input. The exhaust air is preheated by its first passage through the stack, and a duct takes this exhaust air around to the front of the stack to re-use, possibly mixed with a proportion of cool air, thus reducing the overall cooling efficiency and allowing the fuel cell stack to run efficiently at low ambient temperatures. A potential disadvantage of this arrangement is that extensive ducting is required to pass air from an output face of the fuel cell stack, right around the stack to the input face. This adds to the bulk of the fuel cell system and limits the amount of space for other support systems to be built on to the fuel cell stack.

A further potential disadvantage of this recirculating arrangement is that the recirculated warm air, when mixed with very cold ambient air, can cause substantial condensation to occur at the inlet to the fuel cell stack.

DISCLOSURE

It is an object of the present invention to provide an alternative arrangement for providing a degree of control over the cooling efficiency of air flows through a fuel cell stack.

According to one aspect, the present invention provides a fuel cell stack assembly comprising:
   a stack of fuel cells, each fuel cell having a cooling air conduit with an input/output ventilation aperture disposed on a ventilation face of the stack, the ventilation apertures forming an array over said ventilation face of the stack;
   a first fan configured to direct air flow through a first portion of the ventilation face and a second fan configured to direct air flow through a second portion of the ventilation face;
   a reconfigurable plenum in fluid communication with said first fan and said second fan, the plenum having a first configuration in which air is directed, by the first and second fans, through the first and second portions of the ventilation face in the same direction, and a second configuration in which air is directed, by at least one of the fans, respectively through the first and second portions of the ventilation face in opposing directions.

The plenum may be automatically reconfigurable as a function of operating temperature of at least a portion of the fuel cell stack and/or time of operation. The reconfigurable plenum may comprise: a first end proximal to said first and second fans and a second end distal to said first and second fans switchable between an open configuration and a closed configuration, the open configuration facilitating exit of air flow from the plenum at the second end and the closed configuration forcing return of at least some air from the first fan to the second fan. The reconfigurable plenum may be reconfigurable in a plurality of intermediate configurations between the open configuration and the closed configuration each intermediate configuration forcing return of different proportions of air from the first fan to the second fan. The reconfigurable plenum may include a variable occluding member at the second end of the plenum. The fuel cell stack assembly may include a fan controller configured to drive the first and second fans in opposing directions when the reconfigurable plenum is in the second configuration. The fuel cell stack assembly may include a fan controller configured to drive the first fan and shut down the second fan when the reconfigurable plenum is in the second configuration. The fuel cell stack assembly may include a plurality of said first fans and a plurality of said second fans, each of the first and second fans cooperating with a said reconfigurable plenum. The first fans and the second fans may be arranged in groups, each group cooperating with one said reconfigurable plenum. The first portion of the ventilation face and the second portion of the ventilation face may correspond to different parts of the same cells. The first fan and the second fan may be adjacent one another and adjacent the ventilation face. The fuel cell stack assembly may include a first reverse operating fan configured to direct air flow through the first portion of the ventilation face in a direction opposite to that of the first fan and a second reverse operating fan configured to direct air flow through the second portion of the ventilation face in a direction opposite to that of the second fan. The fuel cell stack may include a control system adapted to, when the system is operating in the second configuration, periodically reverse the directions of air flow through the first and second portions of the ventilation face.

According to another aspect, the present invention provides a method of operating an air cooled fuel cell stack in which each fuel cell in the stack has a cooling air conduit with an input/output ventilation aperture disposed on a ventilation face of the stack, the ventilation apertures forming an array over said ventilation face of the stack, the ventilation face having a first portion and a second portion, the method comprising:

in a first mode of operation, ventilating the stack using a first fan and a second fan, the first fan directing air through a first portion of the ventilation face and the second fan directing air through a second portion of the ventilation face, the air flow through the first and second portions being in the same direction;

in a second mode of operation, ventilating the stack using at least the first fan to direct air through the first portion of the ventilation face in a first direction and through the second portion of the ventilation face in a second direction opposite to the first direction.

In the second mode of operation, the stack may be ventilated using the first fan to direct air flow through the first portion of the ventilation face in said first direction and using the second fan to direct the air through the second portion of the ventilation face in said second direction opposite to the first direction. Operation of the fuel cell stack ventilation may be switched between the first and second modes of operation by reconfiguring a reconfigurable plenum in fluid communication with said first fan and said second fan, the reconfigurable plenum having a first end proximal to said first and second fans and a second end distal to said first and second fans which is switchable between an open configuration and a closed configuration, the open configuration facilitating exit of air flow from the plenum at the second end and the closed configuration forcing return of at least some air from the first fan to the second portion of the ventilation face. Automatic switching between the first and second modes, as a function of operating temperature of the fuel cell and/or time of operation, may be provided. When operating in the second mode of operation, the directions of air flow through the first and second portions of the ventilation face may be periodically reversed.

DRAWINGS

Embodiments of the present invention will now be described by way of example and with reference to the accompanying drawings in which.

FURTHER DISCLOSURE

The present invention will now be described in relation to air-cooled "open cathode" fuel cell technology in which the cooling air flow passes directly through cathode flow channels that provide oxidant to the MEA. However, the principles described here can be deployed more generally for fuel cell air cooling, e.g. where the cooling air flow is not necessarily the same as the oxidant flow.

Figure 1:
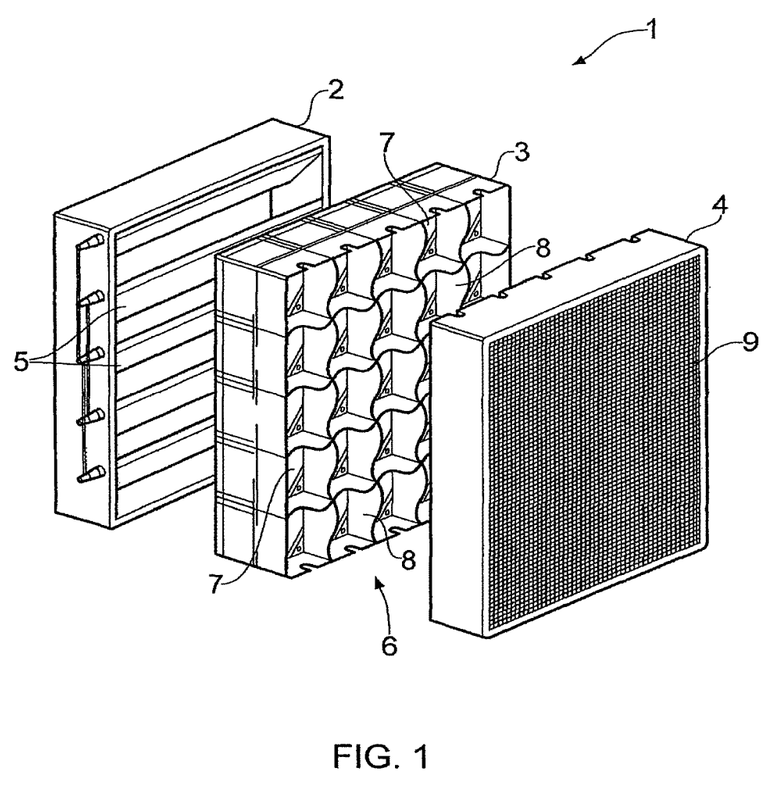
FIG. 1 shows an exploded perspective view of louver panel, fan containment box and air filter box components of a ventilation system for a fuel cell stack.

With reference to FIG. 1, a ventilation assembly 1 for a fuel cell stack (not shown) comprises louver panel 2, a fan containment box 3 and an air filter box 4. The louver panel 2 has a number of louvers 5 which can be varied in their angular disposition or position so as to vary a flow of air through the panel 2. The fan containment box 3 has an array 6 of fans 7 each housed within an air guide chamber 8. The filter box 4 comprises one or more a filter units 9. The louver panel 2, fan containment box 3 and air filter box 4 can be assembled in a number of ways, together with or around further components such as a fuel cell stack, as will become apparent later.

Figure 2:
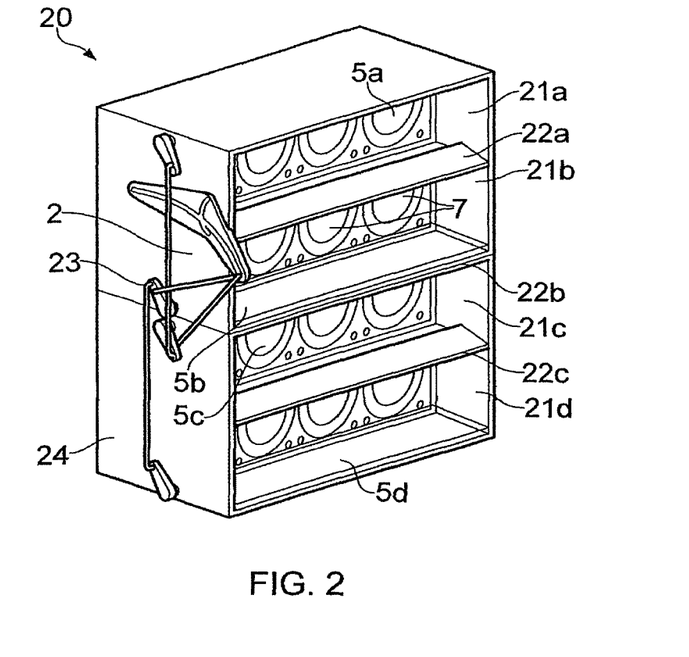
FIG. 2 shows a perspective view of the assembled louver panel and fan containment box of FIG. 1, from the reverse side, in a horizontally-banked, lower bank vented configuration.

FIG. 2 shows parts of a ventilation assembly 20 similar to that shown in FIG. 1 viewed from the other side. The ventilation assembly 20 is shown in a horizontally-banked, lower bank vented configuration, in which the fans 7 are grouped horizontally in banks 21a-21d. Each bank 21 has a louver 5 and the louvers have been labelled respectively 5a-5d. It can be seen that louvers 5a and 5c are in fully closed positions, i.e. vertical as drawn, whereas louvers 5b and 5d are in a fully open position, i.e. horizontal as drawn. Each 21 bank is separated by a partition 22 respectively labelled 22a-22c. As will be described in more detail later, partitions 22a and 22c have a wedge shape on each face whereas central partition 22 is flat on each face. A set of control elements 23 is provided on a side face 24 of the ventilation assembly to control the disposition of the louvers 5a-5d.

Figure 3:
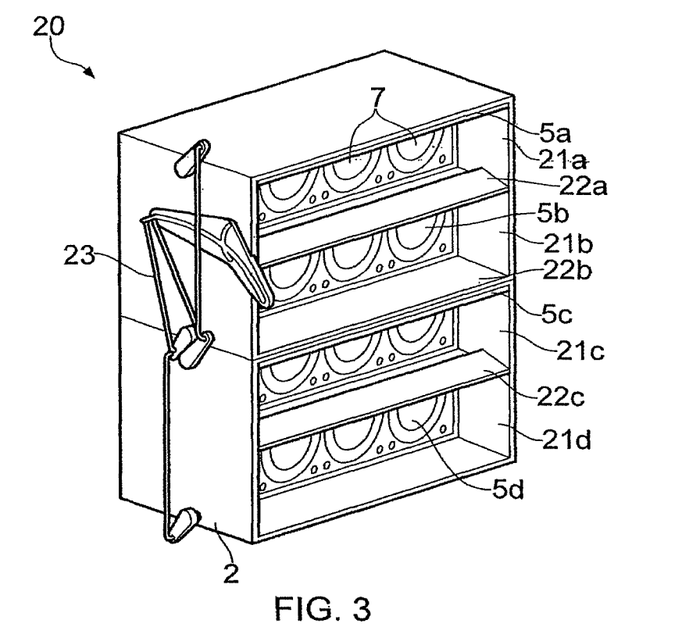
FIG. 3 shows a perspective view of the assembled louver panel and fan containment box of FIG. 1, from the reverse side, in a horizontally-banked, upper bank vented configuration.

FIG. 3 shows the ventilation assembly 20 in a horizontally-banked, upper bank vented configuration, in which the fans 7 are grouped horizontally in banks 21a-21d. It can be seen that louvers 5b and 5d are in fully closed positions, i.e. vertical as drawn, whereas louvers 5a and 5c are in a fully open position, i.e. horizontal as drawn. The set of control elements 23 on side face 24 is repositioned compared with FIG. 2 consistent with the different disposition of the louvers 5a-5d.

Figure 4:
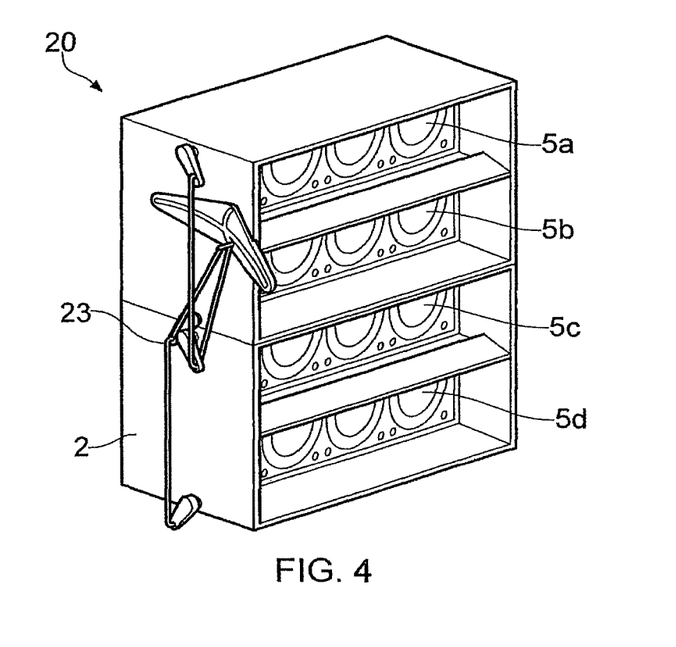
FIG. 4 shows a perspective view of the assembled louver panel and fan containment box of FIG. 1, from the reverse side, in a fully closed configuration.

FIG. 4 shows the ventilation assembly 20 in a fully closed configuration, in which the louvers 5a to 5d are all in fully closed positions, i.e. vertical as drawn. The set of control elements 23 on side face 24 is repositioned compared with FIGS. 2 and 3 consistent with the different disposition of the louvers 5a-5d.

Figure 5:
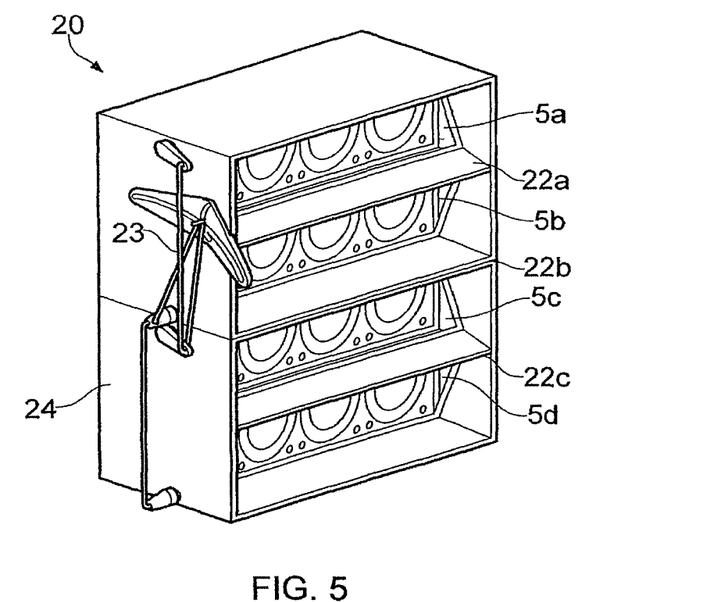
FIG. 5 shows a perspective view of the assembled louver panel and fan containment box of FIG. 1, from the reverse side, in a horizontally-banked, full recirculation configuration.

FIG. 5 shows the ventilation assembly 20 in a full recirculation configuration, in which the louvers 5a-5d are all in a recirculation position which is oblique to both the vertical (closed) position and the horizontal (open) positions of FIGS. 2 to 4. The precise angle at which the louvers are positioned to achieve the full recirculation configuration is dependent on the wedge shape of partitions 22a and 22c as will be better described later in connection with FIGS. 7 and 8. The set of control elements 23 on side face 24 is positioned consistent with the disposition of the louvers 5a-5d.

Figure 6:
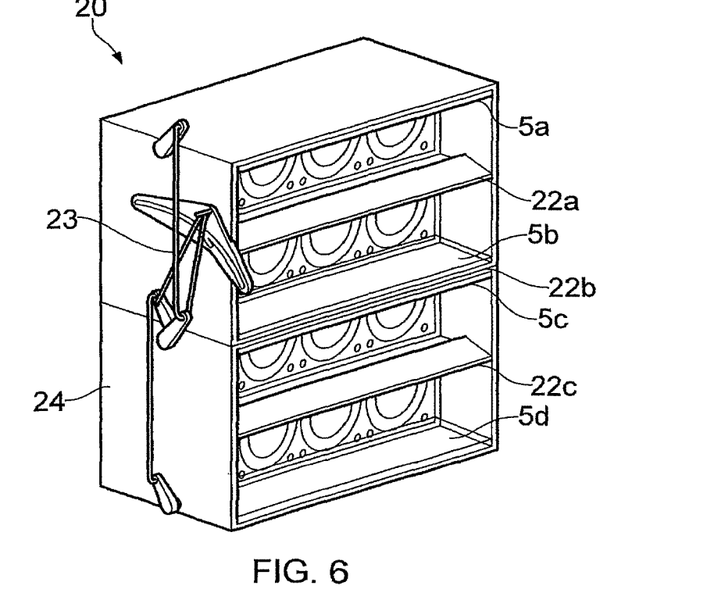
FIG. 6 shows a perspective view of the assembled louver panel and fan containment box of FIG. 1, from the reverse side, in a horizontally-banked, fully open configuration.

FIG. 6 shows the ventilation assembly 20 in a fully open configuration, in which the louvers 5a to 5d are all in fully open positions, i.e. horizontal as drawn. The set of control elements 23 on side face 24 are positioned consistent with the disposition of the louvers 5a-5d.

Figure 7:
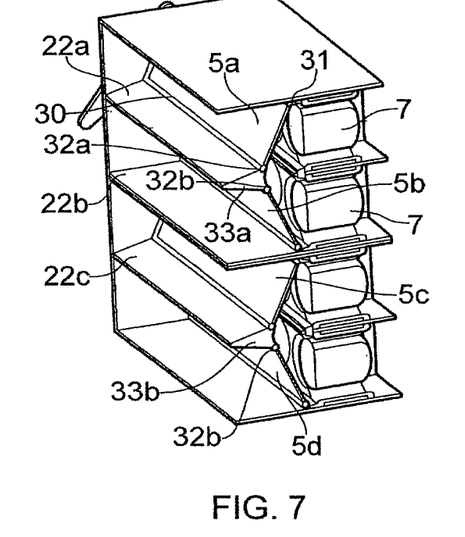
FIG. 7 shows a cross-sectional perspective view of the assembled louver panel and fan containment box of FIG. 1, from the reverse side, in the horizontally-banked, full recirculation configuration of FIG. 5.

FIG. 7 shows the ventilation assembly 20 in cross-section to better show the full recirculation configuration of FIG. 5. Partitions 22a and 22c have a wedge shape profile such that when the louvers 5a-5d are positioned at an appropriate angle as shown, a distal edge 30 (opposite to the hinged edge 31) of each louver 5 abuts the wedge 33 at a wide end corner 32a or 32b thereof. The louvers 5a and 5b each abut a respective corner of the wedge 33a and the louvers 5c and 5d each abut a respective corner of the wedge 33b.

Figure 8:
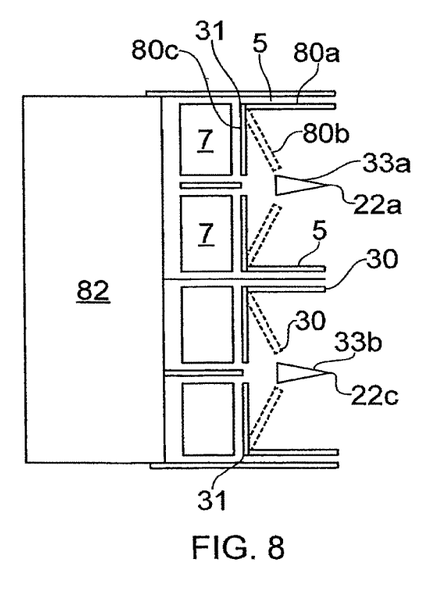
FIG. 8 shows a schematic cross-sectional view of the louver panel and fan containment box showing three positions of the louvers.

FIG. 8 shows the three positions of each louver 5 described so far. Position 80a identifies the louver 5 in fully open (horizontal) position; position 80b identifies the louver 5 in full recirculation position; and position 80c identifies the louver 5 in fully closed position. The louvers 5 are each hinged at a hinged edge 31. FIG. 8 also shows one possible disposition of a fuel cell stack 82 adjacent the array 6 of fans 7.

Figure 9A:
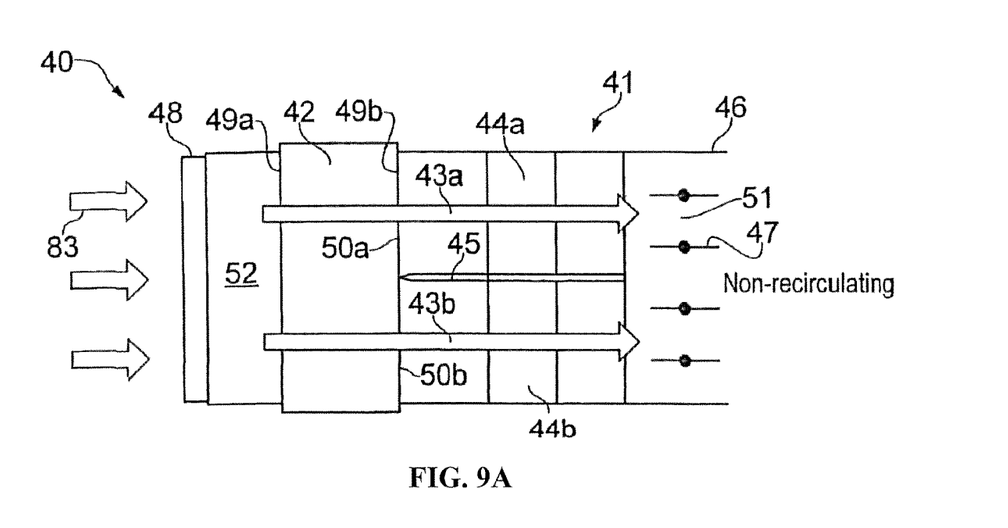
FIGS. 9A and 9B show schematic cross-sectional views of a fuel cell stack with a ventilation system including an alternative configuration of louver panel with FIG. 9A showing a fully open, non-recirculating configuration and with FIG. 9B showing a fully recirculating configuration.
Figure 9B:
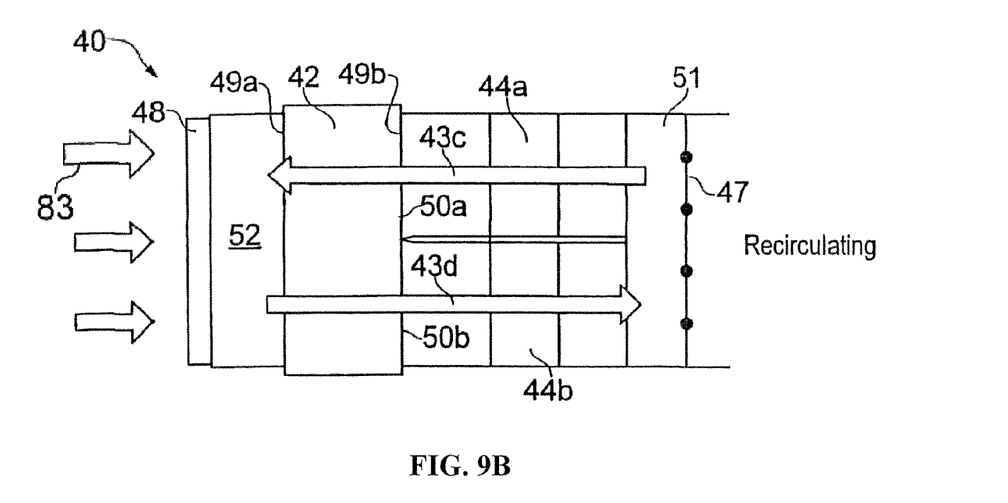

FIGS. 9A and 9B show a schematic view of a fuel cell stack assembly 40 incorporating an alternative arrangement of ventilation assembly 41. A fuel cell stack 42 is disposed with in an air flow path 43a, 43b generated by fans 44a, 44b. The fuel cell stack comprises a stack of fuel cells each of which has one or more cooling air conduits extending therethrough, and each cooling air conduit has input/output ventilation apertures disposed on a first ventilation face 49a and on a second ventilation face 49b of the stack. The ventilation apertures thereby form an array over each of the first and second ventilation faces 49a, 49b of the fuel cell stack.

The fans 44 form an array similar to that described in connection with FIGS. 1 to 8 and each fan lies in an air guide chamber, a partition wall of which is seen at 45. It will be understood that the two fans 44a, 44b visible may represent only a part of the array, which could extend in the plane orthogonal to the drawing, and could have further fans above/below those shown in the drawing. Each of the fans 44a, 44b is configured to direct air flow through a respective portion 50a, 50b of the ventilation face, each portion thereby corresponding to an area of the ventilation face 49b covered by a respective fan. A louver panel 46 includes a number of louvers 47 which can be varied in their angular disposition or position so as to vary a flow of air through the louver panel 46. In FIG. 9A, the louvers 47 are shown in a fully open, non-recirculating position while in FIG. 9B the louvers 47 are shown in a fully closed, full recirculation position. It will be understood that the louvers 47 could also be deployed in a partially open, partial recirculation position where some air is allowed to pass through the louvers. A filter box 48 is positioned in front of the fuel cell stack 42.

Figure 10:
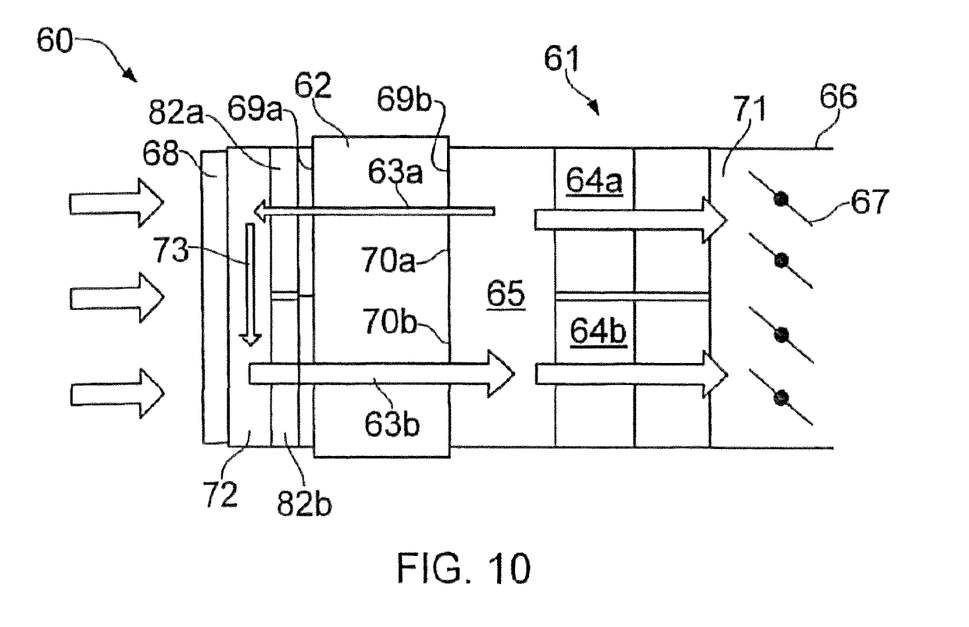
FIG. 10 shows a schematic cross-sectional view of a fuel cell stack with a ventilation system including an alternative configuration of louver panel in a partially open, partially recirculating configuration.

FIG. 10 shows a schematic view of another alternative arrangement of a fuel cell stack assembly 60 incorporating an alternative arrangement of ventilation assembly 61. A fuel cell stack 62 is disposed within air flow paths generated by forward fans 64a, 64b and reverse flow fans 82a, 82b. The fuel cell stack 62 comprises a stack of fuel cells each of which has one or more cooling air conduits extending therethrough, and each cooling air conduit has input/output ventilation apertures disposed on a first ventilation face 69a and a second ventilation face 69b of the stack. The ventilation apertures thereby form an array over the first and second ventilation faces 69a, 69b of the fuel cell stack. The fans 64, 82 form two arrays similar to those described in connection with FIGS. 1 to 8. However, in this arrangement, the forward fans 64 generally share an air guide chamber 65, without a partition wall 45 of the arrangement of FIGS. 9A and 9B. Similarly, the reverse fans 82a, 82b generally share a forward air guide or forward plenum 72. The two forward fans 64a, 64b and the two reverse fans 80a, 80b that are visible may represent only a part of the arrays, which could extend in the plane orthogonal to the drawing, and could have further fans above/below those shown in the drawing. Each of the forward fans 64a, 64b is configured to generally direct air flow through a respective portion 70a, 70b of the ventilation face 69b, although if the fans are operating at different rates, some air transfer via the air guide chamber 65 is possible. A louver panel 66 includes a number of louvers 67 which can be varied in their angular disposition or position so as to vary a flow of air through the louver panel 66. In FIG. 10, the louvers 67 are shown in a partially open, partial recirculation position where some air is allowed to pass through the louvers. The louvers 67 can also be deployed in a fully open, non-recirculating position or a fully closed, full recirculation position and all positions therebetween. A filter box 68 is positioned in front of the fuel cell stack 62. The reverse fans 82a, 82b may be lower power fans that the forward fans 64a, 64b.

The operation of the various ventilation assemblies will now be described.

First referring to FIG. 9A, in first mode of operation, the ventilation assembly 41 ventilates the fuel cell stack 42 in a full, non-recirculating manner in which the fans 44 all draw air through a respective portion of the fuel cell stack 42 in the same direction as indicated by arrows 43a and 43b and the air is expelled through the open louvers 47. Maximal cooling is achieved (for a given fan speed). In a second mode of operation shown in FIG. 9B, the louvers 47 are completely closed and the upper fan 44a is switched into reverse to direct air back through the stack 42 as depicted by reverse air flow path 43c, while the lower fan 44b is maintained in a forward direction to draw air through the stack 42 in the forward direction depicted by air flow path 43d. The closed louvers 47 ensure that the air flow 43d that is directed through the portion 50b of ventilation face 49b by fan 44b in a forward direction enters a plenum 51 and is then forced to return as air flow 43c in a reverse direction to be directed through the portion 50a of ventilation face 49b by the reverse operating fan 44a. The partition wall 45 ensures separation of forward and reverse air flows 43d, 43c. The reverse air flow 43c might not require reverse operation of fan 44a. Some fan types do not run well or efficiently (or possibly do not run at all) in reverse direction and thus it is possible to rely solely on the backpressure provided by the closed louvers 47 defining a closed-ended plenum 51 to redirect the air flow, and switching off (or substantially reducing operation of) the fan 44a. Minimal or reduced cooling is achieved in that a maximum or substantial proportion of cooling air flow through the stack 42 has already passed through the stack once and is therefore somewhat preheated.

In a partial recirculation configuration, the louvers 47 are partially open, e.g. disposed at an oblique angle (e.g. similar to the disposition of louvers 67 shown in FIG. 10). By switching off (or substantially reducing operation of) one of the fans (e.g. 44a), a proportion of the air flow 43d from the portion 50b of ventilation face 49b can be directed back as air flow 43c, as the louvers 47 and cessation or slowing of fan 44a create an increased back pressure. A portion of the stack 42 corresponding to the portion 50a of ventilation face 49b will receive reduced cooling according to (a) the preheat of the reverse air flow, and (b) the reduction in total volume of air flow caused by the reduced back pressure of having the louvers 47 partially open. The louvers can adopt a plurality of possible intermediate configurations between the open configuration and the closed configuration for forcing return of different proportions of air.

At the inlet end adjacent to filter 48, depending on the impedance to air flow provided by filter 48, the forward and return air flows 43d, 43c may be mixed to a certain extent in a forward plenum 52 thereby resulting in repeat partial recirculation of air. This could be further controlled by adjusting air flow impedance through the filter. If repeat recirculation is not required, it can be avoided or substantially reduced by positioning the filter 48 immediately adjacent to the ventilation face 49a, i.e. eliminating forward plenum 52.

In a general aspect, it can be seen that the ventilation assembly 41 provides, by way of the louver panel 46, a reconfigurable plenum 51 in fluid communication with a first fan 44b and a second fan 44a. The reconfigurable plenum 51 has a first configuration (FIG. 9A) in which air is directed, by the first and second fans 44b, 44a, through first and second portions 50b, 50a of the ventilation face 49b in the same direction. The reconfigurable plenum has a second configuration (FIG. 9B) in which air is directed, by at least one of the fans 44b, respectively through the first and second portions 50b, 50a of the ventilation face 49b in opposing directions. This second configuration may or may not be assisted by the reverse operation of fan 44a. The ventilation assembly 41 also provides a plurality of intermediate positions between these two extremes by control of the louver 47 angle and fan speed.

The second configuration can be reversed such that fan 44a becomes the forward driving fan and fan 44b is either switched off or driven in reverse. In this way, the portion of the stack that receives the primary cooling air flow and the portion which receives the subsequent pre-heated reverse air flow can be swapped, ensuring that temperature control can be controlled for all portions of the stack 42.

The ventilation assembly of FIG. 10 operates in a similar way but with some differences. In first mode of operation, with the louvers 67 fully open, the ventilation assembly 61 ventilates the fuel cell stack 62 in a full, non-recirculating manner in which the fans 64a, 64b all draw air through respective portions 70a, 70b of the fuel cell stack 62 in the same direction and the air is expelled through open louvers 67. Maximal cooling is achieved (for a given fan speed). In a second mode of operation, the louvers 67 are completely closed and the upper fan 64a may be stopped, slowed or reversed. The closure of the louvers 67 causes backpressure so that the pressure in air guide chamber 65 rises. By actuation of reverse flow fan 82a, at least a proportion of the air flow 63b is directed back through the stack 62 as depicted by reverse air flow path 63a. If the fan 64a is stopped or slowed while fan 64 runs at normal speed, then the fans 64b, 64a will also generate a contribution to backward flow 63a, and the reverse fan 82a may not be required. Minimal or reduced cooling is achieved in that a maximum or substantial proportion of cooling air flow through the stack 62 has already passed through the stack once and is therefore somewhat preheated.

In another mode of operation as shown in FIG. 10, the louvers 67 are partially open and an air flow intermediate the two previously described configurations will be effected. Increased back pressure from the louvers 67 will slow the forward air flow through fans 64a, 64b. Operation of reverse fan 82a will divert some of air flow 63b across the air guide chamber 65 so that a small reverse flow 63a occurs through the portion 70a of ventilation face 69b. Fans 64a and 64b can be operated at differential speeds to encourage this reverse flow (i.e. fan 64b operating faster than fan 64a). Using separate reverse flow fans 82a, 82b allows use of fans that will not operate in reverse and also provides a greater degree of flexibility in varying air flows in different parts of the fuel cell stack.

At the inlet end adjacent to filter 68, depending on the impedance to air flow provided by filter 68, the forward and return air flows 63b, 63a may mix to a certain extent in a forward plenum 72 as indicated by air flow 73 thereby resulting in repeat partial recirculation of air. This could be further controlled by adjusting air flow impedance through the filter. If repeat recirculation is not required, it can be avoided or substantially reduced by positioning the filter immediately adjacent to the fans 82a, 82b, i.e. eliminating forward plenum 72.

In a general aspect, it can be seen that the ventilation assembly 61 provides, by way of a plenum 71 defined by the louver box 66, the air guide chamber 65 and the fans 82a, 82b, a reconfigurable plenum in fluid communication with a first fan 64b and a second fan 64a, in which the reconfigurable plenum has a first configuration in which air is directed, by the first and second fans 64b, 64a, through first and second portions 70b, 70a of the ventilation face 69b in the same direction, and a second configuration (louvers 67 at least partially closed and reverse fan 80a actuated) in which air is directed, by at least one of the fans 64b, respectively through the first and second portions 70b, 70a of the ventilation face 69b in opposing directions. The ventilation assembly 61 also provides a plurality of intermediate positions between these two extremes by control of the louver 47 angle and by fan speed of at least the reverse fan 82a.

The ventilation assembly 1 or 20 of FIGS. 1 to 8 can be assembled together with a fuel cell stack such as depicted in FIGS. 9A, 9B, and 10, and operates in a similar way but with some differences. In a first mode of operation depicted in FIG. 6, the ventilation assembly 1, 20 ventilates a fuel cell stack in a full, non-recirculating manner in which the fans 7 all draw air through a respective portion of the fuel cell stack in the same direction and the air is expelled through the open louvers 5a-5d (all of which are in position 80a of FIG. 8). In a second mode of operation shown in FIG. 4, the louvers 5 are completely closed (in the position 80c shown in FIG.

8 and air flow through the stack can be completely blocked. In a third mode of operation shown in FIGS. 5 and 7, the louvers 5 are in the recirculation position 80b shown in FIG. 8. The fans 7 in one of the two banks 21a, 21b are switched off or switched into reverse flow operation while the fans 7 in the other one of the two banks 21a, 21b are maintained in a forward flow operation. The positioning of the louvers 5 in the recirculation position 80b then ensures that forward air flow from bank 21a is directed back into bank 21b and thereby directed back through the stack in similar manner to that described in connection with FIGS. 8 to 10.

In a partial recirculation configuration, the louvers 5 are partially open, i.e. allowing some air to pass through the louvers 5.

In a general aspect, it can be seen that the ventilation assembly 1, 20 provides, by way of the louver panel 2, a reconfigurable plenum in fluid communication with a first fan 7 (bank 21a) and a second fan 7 (bank 21b), in which the reconfigurable plenum has a first configuration (louvers in position 80a) in which air is directed, by the first and second fans 7 in banks 21a, 21b, through first and second portions of a ventilation face of a fuel cell stack in the same direction, and a second configuration in which air is directed, by at least one of the fans 7 (e.g. one or more fans in bank 21a), respectively through the first and second portions of the ventilation face in opposing directions. The ventilation assembly 1, 20 also provides a plurality of intermediate positions between these two extremes by control of the louver angle and fan speed.

In all of the described embodiments, the parts of the fuel cell stack which are to be cooled with direct ambient air (from outside the system, e.g. as indicated by air flow 83 in FIGS. 9A and 9B), and those parts which are to be cooled with return air flow which is preheated, can be switched by appropriate selection of the fans 7, 44, 64 and louvers 5, 47, 67 to be deployed and/or adjusted. The fans and louvers can be grouped in banks (e.g. banks 21) in which the fans in a bank or group all operate in concert to direct air flows through selected portions of the stack in the desired direction.

The louvers 5, 47, 67 could be replaced with any other form of closure device which can alter an air flow through a suitable housing defining a plenum, e.g. using shutters, iris diaphragms, etc. In a general sense, the reconfigurable plenum may be defined by any housing which includes any form of variable occluding member at an end of the plenum distal from the fans.

A suitable control mechanism may be used to automatically reconfigure the system according to one or more operating parameters of the fuel cell stack. These parameters can include any one or more of the following: operating temperature of the fuel cell stack or relevant portions of the fuel cell stack; ambient air temperature; temperature of specific air flows through the stack and/or through the ventilation assembly; individual cell temperatures; humidity levels in the stack and/or ambient air; cell or stack voltages; cell or stack currents; or time of operation of the system. One or more physical environment sensors may be disposed at strategic locations of the fuel cell assembly and/or ventilation assembly to monitor any of these parameters. Preferably, reconfiguration of the system is controlled as a function of operating temperature or time or both. The reconfiguration of the system preferably also sequences alternating sections of the stack to periodically receive the direct cooler air and the returned warmer air. Thus, in a general sense, when operating in the second configuration, the system preferably periodically reverses the directions of air flow 43 through the first and second portions 50 of the ventilation face 49. This periodic reversal may also be controlled as a function of operating temperature of at least a portion of the fuel cell stack and/or time of operation. The periodic reversal could be on a fixed or variable frequency according to operating conditions of the fuel cell stack.

The array or arrays of fans may be individually sealed to the stack. An array may be dimensioned to comprise any appropriate number of fans distributed along the planes of the cells in the stack and any appropriate number of fans distributed across planes of the cells in the stack. A fan may straddle across any appropriate number of cells in the stack to define the portions 50 of a ventilation face 49. The fans may be grouped in banks to cooperate with any particular style of reconfigurable plenum.

It is preferable to configure the system such that alternating fans are arrayed along planes of the fuel cell stack such that individual fuel cells each have corresponding "warm" and "cold" sections rather than having alternating fans arrayed across the planes of the fuel cell stack such that there are whole cells in stack which are hot and whole cells in the stack which are cold, which may be more likely to cause failures.

Full closure of the cathode air flows can be effected by complete closure of the louvers e.g. FIG. 4, which may alleviate ram air pressure consequential on a moving vehicle in which the fuel cell is installed. Controlling air flows by full recirculation or closing louvers may also be used to assist in system shutdown.

Other embodiments are intentionally within the scope of the accompanying claims.

The invention claimed is:

1. A method of operating an air cooled fuel cell stack, the method comprising:
   in a first mode of operation, ventilating the stack using a first fan and a second fan, the first fan directing air through a first portion of the ventilation face and a second fan directing air through a second portion of the ventilation face, the air flow through the first and second portions being in the same direction; and,
   in a second mode of operation, ventilating the stack using at least the first fan to direct air through the first portion of the ventilation face in a first direction and through the second portion of the ventilation face in a second direction opposite to the first direction; and,
   wherein each fuel cell in the stack has a cooling air conduit with an input/output ventilation aperture disposed on a ventilation face of the stack, the ventilation apertures forming an array over the ventilation face of the stack, the ventilation face having a first portion and a second portion.

2. The method of claim 1 in which, in the second mode of operation, the stack is ventilated using the first fan to direct air flow through the first portion of the ventilation face in said first direction and using the second fan to direct the air through the second portion of the ventilation face in said second direction opposite to the first direction.

3. The method of claim 1 in which the operation of the fuel cell stack ventilation is switched between the first and second modes of operation by reconfiguring a reconfigurable plenum in fluid communication with said first fan and said second fan, the reconfigurable plenum having a first end proximal to said first and second fans and a second end distal to said first and second fans which is switchable between an open configuration and a closed configuration, the open configuration facilitating exit of air flow from the plenum at the second end and the closed configuration forcing return of at least some air from the first fan to the second portion of the ventilation face.

4. The method of claim 1 further including the step of automatically switching between the first and second modes as a function of operating temperature of the fuel cell and I or time of operation.

5. The method of claim 1 further including, when operating in the second mode of operation, periodically reversing the directions of air flow through the first and second portions of the ventilation face.

6. The method of claim 1, the method further comprising a group of first fans and a group of second fans.

7. The method of claim 1 wherein the first and second fans are arranged in groups, each group cooperating with a configurable and reconfigurable plenum.

* * * * *